June 19, 1962     L. J. LOFTHUS     3,039,391
MAGNETIC CABLE MEASURING DEVICE

Filed April 29, 1952     2 Sheets-Sheet 1

INVENTOR
LEON J. LOFTHUS

BY

ATTORNEYS

June 19, 1962 L. J. LOFTHUS 3,039,391
MAGNETIC CABLE MEASURING DEVICE
Filed April 29, 1952 2 Sheets-Sheet 2

INVENTOR
LEON J. LOFTHUS
BY
ATTORNEYS

United States Patent Office 3,039,391
Patented June 19, 1962

3,039,391
MAGNETIC CABLE MEASURING DEVICE
Leon J. Lofthus, Hyattsville, Md., assignor to the United States of America as represented by the Secretary of the Navy
Filed Apr. 29, 1952, Ser. No. 285,039
8 Claims. (Cl. 102—13)
(Granted under Title 35, U.S. Code (1952), sec. 266)

The invention described herein may be manufactured and used by or for the Government of the United States of America for governmental purposes without the payment of any royalties thereon or therefor.

The present invention relates to apparatus for measuring a length of mooring cable as the cable is payed out, and more particularly to an embodiment of such cable measuring apparatus wherein a magnetic signal is impressed or recorded along the length of the anchor or plummet cable of a mine thereby to operate through a suitable detection circuit a locking device for preventing further paying out of the cable when a desired length thereof has been payed out.

In devices of the prior art, it has been found difficult to accurately measure by mechanical devices the length of a mine cable during the paying out thereof, particularly where the cable is employed in a mine having a time delay between the launching and actuating of the mine. Such devices when submerged in the sea are susceptible to corrosion, fouling by mud and marine growth, and other such difficulties which prevent the accurate and successful operation thereof.

The device of the present invention obviates to a great extent the difficulties of the prior art by avoiding the use of mechanical cable measuring devices and by providing a novel magnetic detection system for measuring the length of the cable, the apparatus being enclosed in a sealed casing against the corrosive effects of sea water. In the present invention the cable is impressed with a magnetic signature prior to launching and indicative of the length of cable payed out. The signature is retained in the cable for a sufficient period of time to function well beyond the period of delay employed between the laying of the mine and the release thereof to a measured distance above the anchor, the length of time of submersion, and the corrosive effect of sea water causing no diminution of the magnetic signature during the delay period.

An object of the invention is to provide a new and improved apparatus for measuring a desired length of cable as it is payed out of the anchor for a moored marine mine.

Another object is to provide magnetic apparatus for measuring accurately the amount of cable payed out from underwater devices regardless of corrosion, growths or other conditions which tend to change the diameter of the cable.

Still another object is to provide an improved cable for use with a moored mine and having a magnetic signature impressed thereon for influencing a control circuit to perform a desired operation in an efficacious manner.

A further object is to provide a method and apparatus for magnetic measuring in a highly accurate manner the length of cable payed out of an underwater ordnance device and for locking the cable against further paying out when a desired length thereof has been measured.

Other objects and many of the attendant advantages of this invention will be readily appreciated as the same becomes better understood by reference to the following detailed description when considered in connection with the acompanying drawings wherein.

Figure 1:
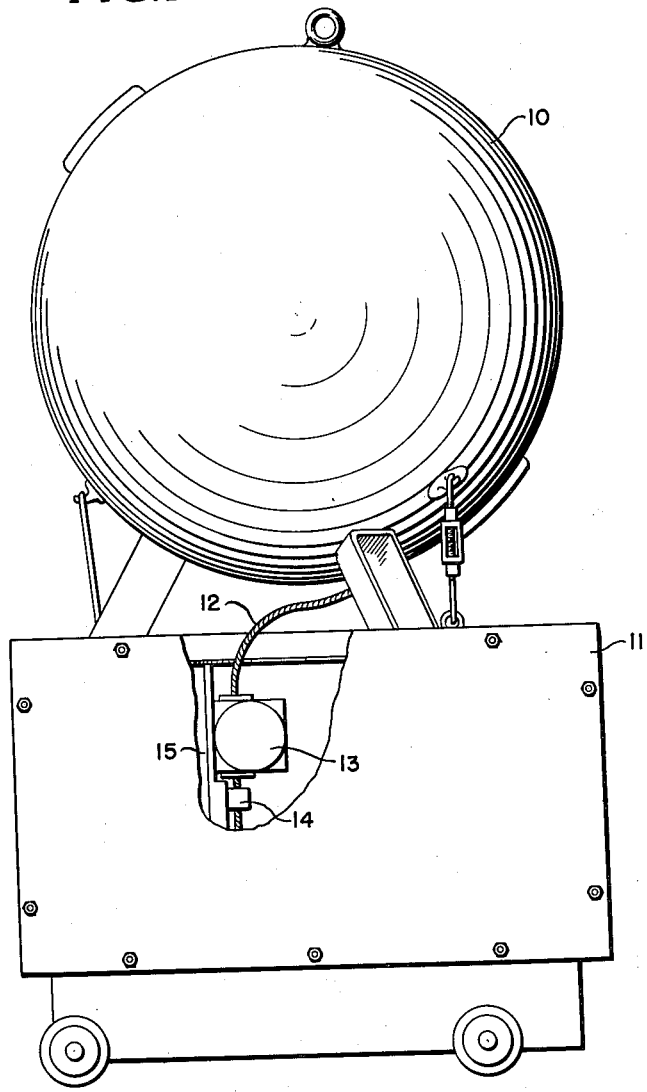
FIG. 1 is a side elevation, parts being broken away, of a mine and anchor employing the apparatus of the present invention.
Figure 3:
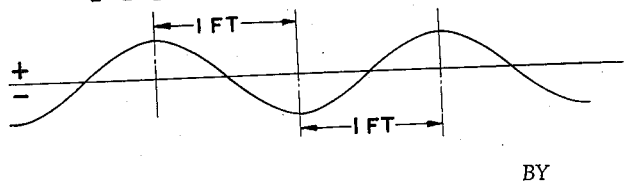
FIG. 3 is a diagram showing a preferred relation of peaks of a wave pattern to length of cable as recorded on the cable employed in the present invention.

Referring more particularly to the drawings wherein like numerals indicate like parts throughout the several views, 10 indicates a marine mine of the moored type and having an anchor 11 attached thereto. A ferro-magnetic mooring cable 12 is secured to mine 10 and extends into anchor 11, passing through locking device 13 and detector coil 14. Both 13 and 14 are attached to a casing 15 which contains the components of the circuit of the present invention. Cable 12, being of ferro-magnetic material is preferably first passed between a pair of axially aligned field coils (not shown) energized by a current having a suitable wave pattern to provide cable 12 with a magnetic signature including positive and negative peaks spaced a measured distance apart along the length of the cable as indicated in FIG. 3. In other words, the peaks of the magnetic signature are spaced on the cable in a manner to indicate feet of length as it is payed out of the mine anchor. It is, of course, understood that the anchor contains a quantity of cable 12 mounted on a drum or other suitable cable dispenser.

Figure 2:
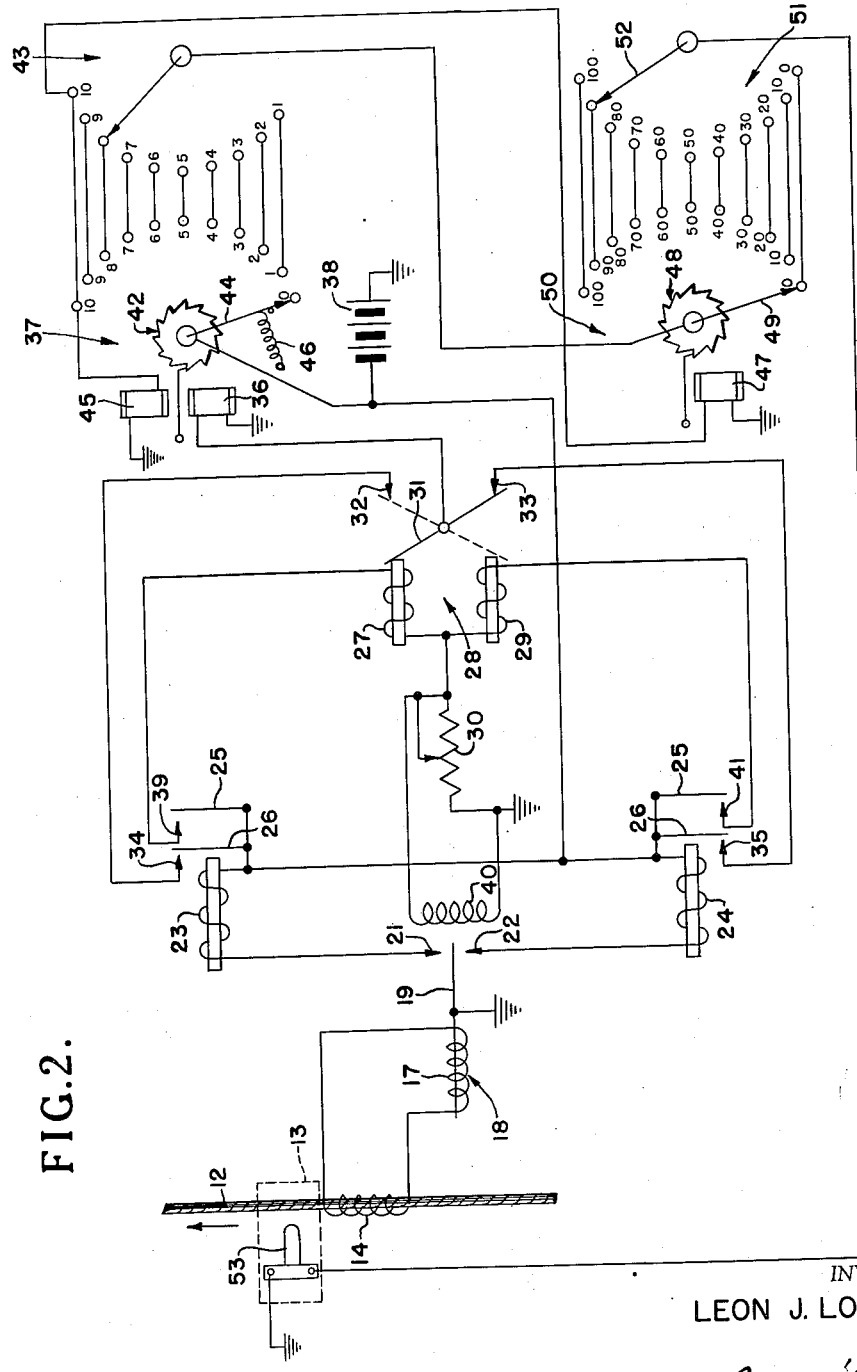
FIG. 2 is a diagram of the circuit employed with the magnetic detection apparatus of the present invention.

The casing 15 is mounted in anchor 11, the casing being sealed in order to exclude water from the components of a detector and counting circuit 16 which is shown in the diagram of FIG. 2.

Referring more particularly to FIG. 2, the magnetized cable 12 passes through the pick-up or detector coil 14 which, in turn, energizes operate coil 17 of a sensitive polarized relay 18 which is of a well-known variety. A contact arm 19 is moved toward contact 21 or 22 by coil 17, the direction of movement depending upon the polarity of the signal received by coil 14, as is well known in the art.

A relay 23 is energized as contact 21 is engaged by the arm 19, while a relay 24 is energized as contact 22 is engaged by arm 19. Each of the relays 23 and 24 has two sets of normally open contact members 25 and 26. When relay 23 is energized contact 25 thereof closes the circuit for coil 27 of locking relay 28, likewise when relay 24 is energized contact 25 thereof closes the circuit for coil 29 of locking relay 28.

A rocking contact member 31 is pivoted intermediate the ends thereof and coils 27 and 29 are mounted respectively adjacent opposite ends of contact member 31 whereby the member is rocked toward coil 27 and away from coil 29 when coil 27 is energized and vice versa when coil 29 is energized. The contacts 32 and 33 are respectively connected to contacts 34 and 35 of the relays 23 and 24.

It will be seen that when a signal peak of one polarity is received by detector coil 14, contact arm 19 of the sensitive relay will move to closed circuit position with respect to contact 21 and when a signal peak of opposite polarity is received, contact arm 19 will move to closed circuit position with respect to contact 22. Thus relays 23 and 24 will be alternately energized as positive and negative peaks of the recorded signature are received by the detector coil 14.

Rocking contact member 31 is connected to operate coil 36 of stepper or counter switch 37 which is of conventional construction. When member 31 engages either contact 32 or 33 energy passes from one side of battery 38 through relays 23 or 24, through contacts 32 or 33 to contact 31 and on to operate magnet 36 and thence to ground. The other side of battery 38 is grounded.

The coils 27 and 29 are connected to contacts 39 and 41 respectively, of the relays 23 and 24 and to reset magnet 40 of sensitive relay 18. The operation of the relay circuit is such that operate magnet 36 is energized while contact member 31 engages either contact 32 or contact 33, thereafter the circuit to magnet 36 is broken by the energization of one of the magnet coils 27 or 29. This may be accomplished in any well-known manner by incorporating a delay in the closing of contacts 26, 34 and 26, 35. Variable resistor 30 preferably is employed for controlling the current through reset magnet 40.

The counter mechanism comprises a pair of stepper or counter switches, a "units" switch 37 and a "tens" switch 50. The "units" switch, of course, counts the individual impulses of the cable 12, while the "tens" switch counts every tenth impulse. It is clear that further switches may be provided to count every hundredth impulse, every thousandth impulse and so forth, if desired.

Referring now to stepper switch 37, a ratchet step mechanism 42 is operated by magnet 36, as aforesaid, one step for each peak of the cable signature, thus moving contact arm 44 from one contact to the next higher, the contacts being numbered from 0 through 10 in steps of one. The 0 contact is in open circuit while the contacts from 1 through 10 are connected to similar contacts of a manual selector switch 43. Manual switch 43 is employed to select the unitary portion of the number indicative of the number of feet of cable payed out.

When contact arm 44 reaches the 10 contact, reset magnet 45 is energized, releasing ratchet mechanism 42 and returning arm 44 to 0 contact through action of spring 46. Simultaneously therewith, operate magnet 47 of tens counter switch 50 is energized causing ratchet mechanism 48 to move contact arm 49 from 0 contact to 10 contact, the contacts being numbered from 0 to 100 in steps of 10. Manual switch 51 is employed to select the "tens" digit of the number of feet of cable desired to be payed out. While the present arrangement employs 100 as the higher number, it is, of course, understood that it may be modified to select any number of feet of length. It is also within the province of the invention to space peaks of the signature on cable 12 so as to cause more cable to be payed out for a given number of peaks, whereby, for example, when 100 contact is reached in switch 50, one thousand feet of cable have been payed out.

Selector arm 52 of switch 51 and contacts 0 through 100 thereof are similar to the contacts of switch 50 and are respectively connected thereto. Arm 52 is connected to an electroresponsive detonator 53 or other means for producing a desired result.

In operation of the counter mechanism contact arm 44 of switch 37 is connected to the battery 38 the other side of the battery being grounded, as aforesaid. It is assumed that switch 43 has been set at "8" and switch 51 has been set at "90" which indicates that ninety eight feet of cable will be measured and payed out of the anchor. As the arm 44 steps from one contact to the other the circuit is open at switch 43 until the 8 contact of switch 37 is reached where the circuit is open at switch 50, the arm 49 being at the zero or open position. As the arm 44 contacts 10 contact the arm 49 is moved to the 10 contact of switch 50 and arm 44 returns to zero. These cycles of operation continue until arm 49 of switch 50 reaches 90 contact thereof and thereafter arm 44 of switch 37 reaches 8 contact thereof, whereupon the circuit is closed from battery 38 through switches 37, 43, 50 and 51 to the detonator 53 thus firing the detonator.

Preferably the detonator 53 is mounted in the cable locking device 13 which contains a suitable swaging device adapted to be operated by the firing of the detonator. Such a device is disclosed in the copending application of Charles F. Bowersett for Explosive Swaging Device for a Marine Mine, Serial No. 285,040, filed April 29, 1952, now Patent No. 3,016,828.

It is also apparent that the magnetic detection circuit and apparatus of the present invention may be employed for performing other useful functions than those herein described, such for example, as employing the plummet line as the carrier of a magnetic recording to influence a similar counting circuit to perform an operation such, for example as energizing a mechanism for releasing the mine from the anchor when a desired length of plummet line has been payed out.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. Apparatus for measuring during the paying out thereof the length of a cable impressed with a uniform magnetic wave pattern indicative of the length thereof and comprising, in combination, a detector coil for detecting said wave pattern as the cable is payed out, circuit means controlled by said coil and energized selectively in accordance with said wave pattern, a counting mechanism, means controlled by said circuit means for energizing said counting mechanism as each wave is detected, electroresponsive explosive means connected to said counting means and operative when the counting means has counted a predetermined number of waves in said pattern and means controlled by said explosive means for locking said cable as the explosive means operates.

2. Apparatus for detecting a magnetic signature having a wave pattern of alternate peaks of opposite polarity impressed on a cable such detecting occurring during the paying out of the cable and comprising, in combination, a pick-up coil surrounding said cable and through which the cable passes during the paying out thereof, said coil being induced to produce a current in accordance with said magnetic signature as the cable passes therethrough, a pair of control circuits a sensitive relay connected to said pick-up coil and influenced by said induced current to close said pair of control circuits alternately in accordance with the alternate peaks of said signature, a reset magnet for said sensitive relay, a stepper switch including an operate magnet, means individual to said control circuits for momentarily energizing the operate magnet of said stepper switch, said energizing means being adapted to energize said reset magnet to reset the sensitive relay to receive the succeeding magnetic signature on said cable, a plurality of contacts on said switch and energized in succeeding order as said operate magnet is energized, an electroresponsive detonator, and manual means for selectively connecting said detonator to one of said stepper switch contacts whereby said detonator is fired when the selected contact is energized.

3. Apparatus for measuring the length of payed out cable comprising, in combination, a ferro-magnetic cable having recorded along the length thereof a magnetic wave pattern comprising peaks of opposite polarity, said peaks occurring at intervals of known distance along the length of said cable, a pick-up coil through which said cable is payed out, a sensitive polarized relay connected to said pick-up coil, a reset magnet for said relay, the wave pattern of the cable providing an induced current in accordance therewith in said pick-up coil as the cable is payed out, a pair of electrical circuits, said polarized relay closing alternately said pair of circuits as polarity of the peaks of the wave pattern changes, a pair of relays, each of said last named relays being connected respectively in said circuits, a magnet circuit, means actuated by each of said pair of relays for closing said magnet circuit, a stepper switch included in said magnet circuit, means connected to said pair of relays for breaking said magnet circuit, means connected in series with the magnet circuit closing means for energizing the reset magnet thereby to set said polarized relay in open circuit position with respect to said pair of circuits as the stepper switch steps.

4. Length measuring apparatus comprising in combination, a length of cable formed of ferro-magnetic material, said cable having recorded thereon a magnetic wave pattern having alternate peaks of opposite polarity disposed at predetermined uniform intervals along the length thereof, a detector circuit, a pick-up coil in said circuit and influenced by said cable for inducing a current in said detector circuit in accordance with said wave pattern as the cable is moved with respect thereto, a normally open operate circuit, relay means actuated by said pick-up coil for closing said operate circuit in accordance with the direction of said current, a stepper switch included in said operate circuit, means including a magnet in said operate circuit for moving said stepper switch one step when said magnet is energized, means including a second relay means in said operate circuit and actuated by said first relay means for deenergizing the operate circuit when said one step has been accomplished, means in series with said second relay means for resetting the first relay means thereby to receive the next succeeding wave peak, and means settable at will to different settings associated with said stepper switch for selecting the number of steps to be taken by said stepper switch.

5. Measuring apparatus for cables comprising, in combination, a cable having magnetically recorded therein a wave pattern having alternate peaks of opposite polarity disposed at predetermined uniform intervals along the length thereof, a detector circuit having means influenced by said cable as the cable is payed out to induce a current in said circuit in accordance with said wave pattern, a relay in said detector circuit adapted to be operated selectively in accordance with the direction of said current, a sensitive relay controlled by said first named relay, a stepper switch, and an operating magnet for said stepper switch, said sensitive relay having means to apply current periodically to said operating magnet each time the sensitive relay operates thereby to register the length of the cable payed out.

6. An apparatus according to claim 5 including a second sensitive relay controlled by said first named relay and operated alternatively with respect to said first named sensitive relay, and means on said second sensitive relay for operating said operating magnet as the second sensitive relay operates.

7. An apparatus according to claim 6 including a switching relay connected to said sensitive relays and operated selectively to either of two positions in accordance with the operated condition of the sensitive relays, said switching relay having the movable element thereof in electrical connection with said stepping magnet and the complementary contacts thereof, connected respectively to said sensitive relays whereby the stepping magnet is energized by each of said sensitive relays as the sensitive relays operate in successive order.

8. An apparatus according to claim 7 including means serially connected to the electroresponsive actuating element of said switching relay and operable synchronously therewith by said sensitive relays for restoring said first named relay as the switching relay operates.

References Cited in the file of this patent
UNITED STATES PATENTS
2,603,688    Cole et al. _____ July 15, 1952